United States Patent Office 2,951,820
Patented Sept. 6, 1960

2,951,820

TERTIARY ALKYL SUBSTITUTED ACRYLAMIDE MODIFIED ALKYD RESINS AND PROCESS OF PREPARING THE SAME

Erhart K. Drechsel, Stamford, Conn., assignor to American Cyanamid Company, New York, N.Y., a corporation of Maine No Drawing. Filed Apr. 11, 1958, Ser. No. 727,792

12 Claims. (Cl. 260—22)

This invention relates to a novel class of oil modified alkyd resins coreacted with monomeric tertiary alkyl acrylamides. Still further, this invention relates to a novel class of coating compositions comprising the interpolymerization reaction product of a tertiary alkyl acrylamide and an oil modified alkyd resin and to the process of preparing the same.

One of the objects of the present invention is to make an improved modified alkyd resin by reacting a tertiary alkyl acrylamide with an oil modified alkyd resin. A further object of the present invention is to produce a coating composition having improved solvent and alkali resistance comprising the interpolymerization reaction product of a tertiary alkyl acrylamide with an oil modified alkyd resin. These and other objects of the present invention will be discussed in greater detail hereinbelow.

In the practice of the process of the present invention, one may use as a starting material an oil-modified alkyd resin. Alternatively, one may react the tertiary alkyl acrylamide with a selected glyceride oil and after polymerization is substantially complete, the polyhydric alcohol and polycarboxylic acid free of non-benzenoid unsaturation are added and esterification is carried out to a comparatively low acid number. The former procedure is preferred. The manufacture of these oil-modified alkyd resins used as a starting material in the practice of the process of the present invention are well known in the art. To prepare such an oil modified alkyd resin, one will use a polycarboxylic acid which is free of non-benzenoid unsaturation. Among the polycarboxylic acids in this category which may be used are phthalic, oxalic, malonic, succinic, glutaric, sebacic, adipic, pimelic, suberic, azelaic, tricarballylic, citric, tartaric, malic and the like. Whenever available, the anhydrides of these acids may be used. These acids and/or their anhydrides may be used either singly or in combination with one another. The preferred polycarboxylic acid in this category, of course, is phthalic. These polycarboxylic acids are used as a rule to the substantially complete exclusion of any $\alpha,\beta$-ethylenically unsaturated polycarboxylic acid, although comparatively small quantities of these acids may be used, such as amounts up to about 10% on a mole basis based on the total weight of polycarboxylic acid used. Among these $\alpha,\beta$-ethylenically unsaturated polycarboxylic acids which may be used are maleic, fumaric, aconitic, itaconic, and the like. Whenever available, the anhydrides of these acids may be used and the anhydrides and/or their acids may be used either singly or in combination with one another.

The second reactant in the preparation of a preformed alkyd resin is the polyhydric alcohol. The polyhydric alcohols used in the practice of the process of the present invention should have an average hydroxy functionality greater than 2 although dihydric alcohols may be used together with polyhydric alcohols having 3 or more hydroxy groups so long as the average functionality in the system is in excess of 2. Among the polyhydric alcohols which may be used in the practice of the process of the present invention are ethylene glycol, diethylene glycol, propylene glycol, dipropylene glycol, trimethylene glycol, tetramethylene glycol, pinacol, arabitol, xylitol, adonitol, mannitol, glycerol, trimethylolpropane, trimethylolethane, sorbitol, pentaerythritol, dipentaerythritol, and the like. Obviously, these polyhydric alcohols may be used either singly or in combination with one another. The amount of polyhydric alcohol used in the practice of the process of the present invention can readily be determined by a skilled chemist on a purely stoichiometrical basis. When the oil length of the ultimate alkyd resin has been determined, the amount of polycarboxylic acid ultimately to be added is determined based on the precalculated oil length and the amount of polyhydric alcohol or mixtures thereof can be readily ascertained with accuracy by calculating the amount of polyhydric alcohol required to substantially completely esterify all of the carboxyl groups available for reaction in the system in the entire course of the reaction. It is generally preferred for most purposes to use a slight excess of polyhydric alcohol as a further assurance of substantially complete esterification. This slight excess may be 5%, 10% or even as much as 25% based on the stoichiometrical calculations. Quantities in excess of 25% could be used, but in view of the fact that they may not enter into the esterification, such additional quantities of polyhydric alcohol would be unnecessary and perhaps even wasted. The oily material used to modify the alkyd resins of the present invention may be either a semidrying glyceride oil or a drying glyceride oil. Additionally, one could use the fatty acids of these glyceride oils and whenever available, their monoglycerides and diglycerides. Among the glyceride oils which may be used in the practice of the process of the present invention are soya oil, linseed oil, dehydrated castor oil, perilla oil, safflower oil, tung oil, oiticica oil, rape seed oil, herring oil, sardine oil, walnut oil, sunflower oil, and the like. Conjunctively or alternatively, one may make use of such acids as myristoleic, palmitoleic, oleic, linoleic, elaeostearic, licanic, ricinoleic, erucic and the like. Additionally, one may make use of tall oil fatty acids and preferably those which have been refined so as to remove not only the rosin acids found in tall oil, but also to remove unsaponifiables, water, and ash, which are generally found in tall oil. Quite obviously, mixtures of these oils and/or their fatty acids may be utilized. It is preferred to use the nonconjugated type of nondrying or semidrying oils either alone or in predominant amounts such as about 95% based on the total weight of the oil material used. The total amount of oily material used in the compositions of the present invention can readily be calculated in advance after one has decided whether or not to make a short oil alkyd resin, a medium oil alkyd resin or a long oil modified alkyd resin. Since these concepts are well known in the art, further delineation thereof is deemed unnecessary at this point. It should be sufficient to say that the development of the art is such that a skilled resin chemist can predetermine the amount of oil to be charged to the reaction vessel while considering the amounts of polycarboxylic acid and polyhydric alcohol to be added.

The conditions of the reaction for preparing the oil-modified alkyd resin with respect to temperature, pressure, and sparging of the system are all well-known in the art and further discussion of the details at this point is deemed to be unnecessary. It is desired to conduct the reaction in the alkyd preparation until an acid number between about 5 and 20 is reached and preferably between about 7 and 15.

If desired, one may use additionally in the preparation of the oil-modified alkyd resin a quantity of an $\alpha,\beta$-ethylenically unsaturated monocarboxylic acid. Among the monocarboxylic acids of this category that may be used in the practice of the process of the present invention are acrylic, methacrylic, crotonic, α,β-dimethyl acrylic acid and the like. These α,β-ethylenically unsaturated monocarboxylic acids may be used either singly or in combination with one another. These acids may be absent from the alkyd composition or may be present in amounts up to about 60 carboxy mole percent based on the total number of moles of the polycarboxylic acid charged, wherein 1 mole of a monocarboxylic acid is equivalent to .5 carboxy mole of 1 mole of a dicarboxylic acid.

Among the N-tertiary alkyl acrylamides which may be used in the practice of the process of the present invention are N-tertiary butyl acrylamide, N-tertiary butyl methacrylamide, N-tertiary amyl acrylamide, N-tertiary amyl methacrylamide, N-tertiary hexyl acrylamide, N-tertiary hexyl methacrylamide, N-tertiary octyl acrylamide, N-tertiary octyl methacrylamide and the like. The total amount of acrylamide monomer used in the practice of the process of the present invention may be varied between about 15% and 60% by weight based on the total weight of the monomer and the oil alkyd resin solids. If desired, one may make use of a second polymerizable monomeric material in combination with the N-tertiary alkyl acrylamides, such as a polymerizable styrene. More particularly, one may use styrene, ring-substituted alkyl styrenes, ring-substituted halo styrenes, side chain substituted alkyl styrenes and side chain substituted halo styrenes. In the latter categories, specific polymerizable styrenes include α-chlorostyrene, α-methylstyrene, ortho-methylstyrene, meta-methylstyrene, para-methylstyrene, 2,4-dimethylstyrene, 2,5-dimethylstyrene, 3,4-dimethylstyrene, 2,4,5-trimethylstyrene, 2,4,5-triethylstyrene, para-ethylstyrene, ortho-bromostyrene, 2-bromo-4-ethylstyrene, para-isopropylstyrene, para-chlorostyrene, 2,4-dichlorostyrene and the like. The N-tertiary alkyl acrylamide oil-modified alkyd resins of the present invention may contain no additional styrene monomer or may contain the styrene monomer polymerized in quantities up to about 3 parts of the polymerized styrene to about 1 part of the polymerizable N-tertiary alkyl acrylamide. Larger proportions may be used but without significant improvement of the properties of the compositions of the present invention.

In the interpolymerization of the tertiary alkyl acrylamides of the present invention with the oil-modified alkyd resins, it is desirable to make use of a polymerization catalyst such as a peroxide type catalyst including benzoyl peroxide, cumene hydroperoxide, tertiary alkyl substituted hydroperoxides and diperoxides, such as 2,2′-bis-(tertiary butyl peroxy)butane, ditertiary butyl peroxide, tertiary butyl hydroperoxide, tertiary butyl propyl peroxide, tertiary butyl pentamethylethyl peroxide and the like. These catalytic agents obviously can be used either separately or in combination with one another. It is only necessary that a comparatively small amount of these catalytic agents be present, such as about 0.5% to about 5.0% by weight based on the total weight of the polymerizable monomeric material and the oil-modified alkyd resin.

Since the resinous materials of the present invention will be utilized primarily in the field of coating resins, it may be desired to add to the resin solution conventional small amounts of metallic driers such as cobalt naphthanate, lead naphthanate and the like. Additionally, one may make use of such conventional surface coating ingredients as pigments, antiskimming agents, anti-cratering agents and the like. It is further conventional to make use of inert organic solvents of which a plurality are known and are available commercially. Reference is made to the U.S. Patent No. 2,748,092 for a description of suitable solvents that may be used to thin out the resinous materials of the present invention.

In order that the concept of the present invention may be more completely understood, the following examples are set forth in which all parts are parts by weight unless otherwise indicated. These examples are set forth primarily for the purpose of illustration and any specific enumeration of details contained therein should not be interpreted as a limitation on the case except as is indicated in the appended claims.

ALKYD RESIN A

Into a suitable reaction vessel equipped with thermometer and stirrer, there is introduced 148 parts of phthalic anhydride, 73 parts of refined soya acids, 38 parts of refined soya oil, 120 parts of dehydrated castor oil and 96 parts of 95% glycerin. The charge is heated gradually permitting any theoretical water to be removed and heated gradually to about 214° C. under a blanket of nitrogen gas and held at about that temperature until an acid number between about 5 and 10 is reached.

ALKYD RESIN B

Into a suitable reaction vessel equipped with thermometer and stirrer, there is introduced 148 parts of phthalic anhydride, 100 parts of crotonic acid, 400 parts of soya oil fatty acids, and 177.5 parts of pentaerythritol. The charge is heated gradually to about a temperature between 210 and 220 and held at that temperature until an acid number of about 8–12 is reached.

Example 1

Into a suitable reaction vessel equipped with thermometer, stirrer, and reflux condenser there is introduced 466 parts of a 60% solution of alkyd resin B dissolved in xylene and is heated gradually to about 135–140° C. Thereto there is added 120 parts of N-tertiary butyl acrylamide, 132 parts of additional xylene and 10 parts of cumene hydroperoxide. With continued heating and constant agitation the charge is heated for about a 5-hour period at about 140° C. The viscous syrup resulting is poured from the container and is ready to use as a coating composition or as a baking enamel. The viscosity of the charge was Z–4 on the Gardner-Holdt scale at 25° C. The solids were 53.9% and the conversion of monomer to polymer is 93.4%.

Example 2

Into a suitable reaction vessel equipped as in Example 1 there is introduced 100 parts of alkyd resin A as a 60% solids solution in xylene, and the charge is heated up to about 130–135° C. To this heated charge there is then added a mixture of 40 parts of monomeric styrene, 10 parts of N-tertiary butyl acrylamide, 25 parts of xylene and 3 parts of cumene hydroperoxide. The addition of the monomer catalyst mixture is accomplished by gradual addition over a prolonged period of time. The heating is maintained and upon the complete addition of the monomer catalyst mixture, the charge is heated gradually to about 138° C. and held at that temperature for about 5 hours. The coating composition thus produced had excellent color and excellent color stability. Films were clear, glossy and hard.

Example 3

Into a suitable reaction vessel equipped as in Example 1, there is introduced 100 parts of alkyd resin A containing 60% solids in xylene and the charge is heated to about 140° C. To the heated alkyd resin there is added a mixture of 30 parts of monomeric styrene, 10 parts of N-tertiary octyl acrylamide, 25 parts of xylene and 3 parts of cumene hydroperoxide. The charge is held at about 140° C. for about a 5-hour period.

Example 4

Into a suitable reaction vessel equipped as in Example 1, there is introduced 133 parts of alkyd resin B containing 60% resin solids in xylene and the charge is heated to about 140° C. Thereto there is added a mixture of 20 parts of N-tertiary butyl acrylamide, 12 parts of xylene and 3 parts of cumene hydroperoxide. The charge is held for about 5 hours at about 135–140° C. until polymerization of the N-tertiary butyl acrylamide is substantially completed.

*Example 5*

Into a suitable reaction vessel equipped with stirrer, thermometer and reflux condenser there is introduced 116.6 parts of alkyd resin B containing 60% resin solids dissolved in xylene and the charge is heated gradually to about 135–140° C. To this heated charge there is then added 30 parts of N-tertiary butyl acrylamide, 18.4 parts of xylene and 3 parts of cumene hydroperoxide. With constant agitation, the heating is continued at about 135–140° C., the reflux temperature, until polymerization is substantially complete requiring about 5 hours.

*Example 6*

Into a suitable reaction vessel equipped as in Example 1 there is introduced 117 parts of alkyd resin B containing about 60% solids dissolved in xylene and the charge is heated gradually to about 130° C. Thereto there is added 30 parts of N-tertiary octyl acrylamide, 18 parts of xylene and 3 parts of cumene hydroperoxide. The charge is maintained at about 135–140° C. for about a 5-hour period.

*Example 7*

Into a suitable reaction vessel equipped as before there is introduced 400 parts of alkyd resin A as a 60% solids solution in xylene and the charge is heated gradually to about the reflux temperature. Thereupon there is added 120 parts of monomeric styrene, 40 parts of N-tertiary butyl acrylamide, and 97 parts of xylene containing 10 parts of cumene hydroperoxide. The charge is heated at about 135–140° C. for about 5 hours whereupon there is added an additional 60 parts of xylene in order to cut the solids to about 55%.

*Example 8*

Into a suitable reaction vessel equipped as before there is introduced 466 parts of alkyd resin B containing 60% solids dissolved in xylene and the charge is heated gradually to about 135° C. whereupon there is added a mixture of 120 parts of N-tertiary butyl acrylamide, 72 parts of xylene and 10 parts of cumene hydroperoxide. The system is maintained at the reflux temperature, namely, at about 140° C. for about a 4½- to 5-hour period whereupon there is added about 60 parts of additional xylene in order to cut the solids down to a less viscous solution.

*Example 9*

Into a suitable reaction vessel equipped as before there is introduced 200 parts of alkyd resin A containing 60% solids dissolved in xylene and the charge is heated gradually to about 130–135° C. While maintaining the temperature at this level, there is added a mixture of 60 parts of monomeric styrene, 20 parts of N-tertiary amyl acrylamide, 48 parts of xylene and 5 parts of cumene hydroperoxide. The charge is heated gradually to about the reflux temperature and maintained at that temperature for about a 5-hour period.

*Example 10*

Into a suitable reaction vessel equipped as before there is introduced 233 parts of alkyd resin B containing 60% solids dissolved in xylene. The charge is heated up to about 135–140° C. and there is then added thereto a mixture of 60 parts of N-tertiary amyl acrylamide, 36 parts of xylene and 5 parts of cumene hydroperoxide. After the addition of the mixture is completed, the charge is held at the reflux temperature for an additional period of about 5 hours.

*Example 11*

Into a suitable reaction vessel equipped as before there is introduced 200 parts of alkyd resin A containing 60% solids dissolved in xylene, and the charge is heated as before. At about 135° C., there is then added a mixture of 60 parts of monomeric styrene, 20 parts of N-tertiary amyl acrylamide, 48 parts of xylene and 5 parts of cumene hydroperoxide. After the addition is completed the charge is maintained at about 140° C. for about a 5-hour period whereupon an additional 30 parts of xylene are added to cut the solids to about 55%.

*Example 12*

Into a suitable reaction vessel equipped as before there is introduced 200 parts of alkyd resin A containing 60% solids dissolved in xylene and the charge is heated as before. To this charge there is added a mixture of 60 parts of monomeric styrene, 20 parts of N-tertiary octyl acrylamide, 48 parts of xylene and 5 parts of cumene hydroperoxide. The charge is maintained at the reflux temperature, namely, 140° C., for about a 5 hour period whereupon an additional 30 parts of xylene are added in order to cut the solids to about 55%.

*Example 13*

Into a suitable reaction vessel equipped as before there is introduced 233 parts of alkyd resin B containing 60% solids dissolved in xylene and the charge is heated as before. At about 135° C. there is added a mixture of 60 parts of N-tertiary amyl acrylamide, 36 parts of xylene and 5 parts of cumene hydroperoxide. The charge is held at about 135–140° C. for about a 5 hour period whereupon there is added about 30 additional parts of xylene to cut the solids to about 55%.

*Example 14*

Into a suitable reaction vessel equipped as before there is introduced 233 parts of alkyd resin B containing about 60% solids dissolved in xylene and the charge is heated as before. To the heated alkyd resin solution there is added about 60 parts of N-tertiary octyl acrylamide, 36 parts of xylene and 5 parts of cumene hydroperoxide. While maintaining the reaction system at the reflux temperature, the polymerization is continued for about a 5 hour period whereupon an additional 30 parts of xylene are added to reduce the solids to about 55%.

*Example 15*

Into a suitable reaction vessel equipped as before there is introduced 100 parts of alkyd resin A containing 60% solids dissolved in xylene. The charge is heated gradually to about 130–135° C. whereupon there is added about 30 parts of monomeric styrene, 10 parts of N-cyclohexyl acrylamide, 25 parts of xylene and 3 parts of cumene hydroperoxide. After the addition of the monomer solvent catalyst mixture, the charge is held at about 140° C. for a period of about 5 hours. The viscosity of the resulting solution at a 61.3% solids was Z–4 to Z–5 on the Gardner-Holdt scale at 25° C. The conversion of monomers to polymer was about 100%.

The coating compositions prepared according to the examples set forth hereinabove are useful in making air-dried films and baked films and would have utility in appliance coatings such as washing machines, refrigerators, stoves or in the automotive industry for the coating of automobiles. Using metallic driers in coating compositions, the drying rate of these compositions to a dust-free state, to a set-to-handle state and to a 10-tack rating was markedly improved over conventional coating resins. Still further, films drawn down from these coating compositions displayed improvements in solvent and alkali resistance.

I claim:

1. A process which comprises heat reacting at a temperature between about 130° C. and the reflux temperature a mixture of a polymerizable styrene and an N-substituted tertiary alkyl acrylamide wherein said alkyl group contains from 4 to 8 carbon atoms with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

2. A process which comprises heat reacting at a temperature between about 130° C. and the reflux temperature a mixture of a polymerizable styrene and an N-substituted tertiary butyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

3. A process which comprises heat reacting at a temperature between about 130° C. and the reflux temperature a mixture of a polymerizable styrene and N-substituted tertiary amyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

4. A process which comprises heat reacting at a temperature between about 130° C. and the reflux temperature a mixture of a polymerizable styrene and N-substituted tertiary octyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

5. A process which comprises heat reacting at a temperature between about 130° C. and the reflux temperature a mixture of styrene and an N-substituted tertiary alkyl acrylamide wherein said alkyl group contains from 4 to 8 carbon atoms with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

6. A process which comprises heat reacting at a temperature between about 130° C. and the reflux temperature a mixture of styrene and N-substituted tertiary butyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

7. A process which comprises heat reacting at a temperature between about 130° C. and the reflux temperature a mixture of styrene and N-substituted tertiary amyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

8. A process which comprises heat reacting at a temperature between about 130° C. and the reflux temperature a mixture of styrene and N-substituted tertiary octyl acrylamide with an oil modified alkyd resin in the presence of a mutually inert organic solvent and a polymerization catalyst wherein said acrylamide is present in an amount varying between about 15% and 60% by weight based on the total weight of said acrylamide and said alkyd resin and wherein said styrene is present in an amount up to three times the amount of said acrylamide present.

9. The resinous reaction product of (1) a polymerizable styrene, (2) an N-substituted tertiary alkyl acrylamide wherein said alkyl group contains from 4 to 8 carbon atoms, (3) a material selected from the group consisting of glyceride oil, glyceride oil fatty acids and their monoglycerides, (4) a polyhydric alcohol, and (5) a polycarboxylic acid free of non-benzenoid unsaturation, dispersed in an inert organic solvent wherein said acrylamide is present in an amount varying between about 15% and 60% by weight based on the total weight of said acrylamide and said alkyd resin and wherein said styrene is present in an amount up to three times the amount of said acrylamide present.

10. The resinous reaction product of (1) styrene, (2) N-substituted tertiary butyl acrylamide, (3) a material selected from the group consisting of glyceride oil, glyceride oil fatty acids and their monoglycerides, (4) a polyhydric alcohol, and (5) a polycarboxylic acid free of non-benzenoid unsaturation, dispersed in an inert organic solvent wherein said acrylamide is present in an amount varying between about 15% and 60% by weight based on the total weight of said acrylamide and said alkyd resin and wherein said styrene is present in an amount up to three times the amount of said acrylamide present.

11. The resinous reaction product of (1) styrene, (2) N-substituted tertiary amyl acrylamide, (3) a material selected from the group consisting of glyceride oil, glyceride oil fatty acids and their monoglycerides, (4) a polyhydric alcohol, and (5) a polycarboxylic acid free of non-benzenoid unsaturation, dispersed in an inert organic solvent wherein said acrylmide is present in an amount varying between about 15% and 60% by weight based on the total weight of said acrylamide and said alkyd resin and wherein said styrene is present in an amount up to three times the amount of said acrylamide present.

12. The resinous reaction product of (1) styrene, (2) N-substituted tertiary octyl acrylamide, (3) a material selected from the group consisting of glyceride oil, glyceride oil fatty acids and their monoglycerides, (4) a polyhydric alcohol, and (5) a polycarboxylic acid free of non-benzenoid unsaturation, dispersed in an inert organic solvent wherein said acrylamide is present in an amount varying between about 15% and 60% by weight based on the total weight of said acrylamide and said alkyd resin and wherein said styrene is present in an amount up to three times the amount of said acrylamide present.

References Cited in the file of this patent
UNITED STATES PATENTS

| | | |
|---|---|---|
| 2,598,663 | Kropa | June 3, 1952 |
| 2,598,664 | Kropa | June 3, 1952 |
| 2,600,457 | Wynstra | June 17 1952 |